Aug. 29, 1950  L. GERACI ET AL  2,520,241
TIRE PRESSURE SWITCH UNIT

Filed May 9, 1947  3 Sheets-Sheet 1

Inventors
Lester Geraci
Angelo Pablovich

By Clarence A. O'Brien
and Harvey B. Jacobson
Attorneys

Aug. 29, 1950 — L. GERACI ET AL — 2,520,241
TIRE PRESSURE SWITCH UNIT
Filed May 9, 1947 — 3 Sheets-Sheet 2

Inventors
Lester Geraci
Angelo Pablovich

Aug. 29, 1950        L. GERACI ET AL        2,520,241

TIRE PRESSURE SWITCH UNIT

Filed May 9, 1947        3 Sheets-Sheet 3

Inventors
Lester Geraci
Angelo Pablovich

By *Clarence A. O'Brien*
and *Harvey B. Jacobson*
Attorneys

Patented Aug. 29, 1950

2,520,241

UNITED STATES PATENT OFFICE 2,520,241

TIRE PRESSURE SWITCH UNIT

Lester Geraci and Angelo Pablovich, New Orleans, La., assignors of twenty-five per cent to Peter Noto, and twenty-five per cent to Frank Noto, both of New Orleans, La.

Application May 9, 1947, Serial No. 747,078

2 Claims. (Cl. 200—58)

This invention relates to a signal device for warning the operator of a vehicle upon which the device is installed of the condition of the tires of said vehicle, and more especially, when the same are deflated or under-inflated.

The object of the invention is to provide a signal system including certain visual signals, such as lights, or other signals which may be audible signals, connected to each tire of the vehicle and operated by the pressures in each individual tire, to indicate the condition of the air pressure therein and especially when the same is below normal required for the vehicle and load as normal operating pressure, and which is designed to close a circuit to the signal when the pressure is below normal, so as to indicate to the driver or operator of the vehicle when a tire is deflated or the internal pressure thereof is below normal operating pressure by an individual signal for each tire, so that proper steps can be taken to properly inflate the tire or repair the same, thereby avoiding accidents.

Another object of the invention is to provide a signal device for each wheel and tire, including a switch associated with each wheel and operated by the pressure within the tire to close a circuit to a signal on the dash, to indicate by means of a light or direct reading of such pressure due to a deflated condition of a tire, so as to indicate which tire is under-inflated and needs attention, and which includes a source of electrical energy or battery connected in circuit with the switches of each wheel for independent operation according to the pressure in each tire independently and selectively controlled, said circuit being grounded to the frame of the automobile or truck and operative in connection with single or dual wheels and tires, as well as of simple construction involving a minimum number of parts which can be easily installed and serviced, while requiring little servicing once installed for use.

Another object of the invention is to provide a signal device which includes a plurality of signals or pilot lights on an instrument panel operative in connection with each tire so that the operator will know which one is below normal inflation, or which operates in connection with an ammeter and a carbon pile rheostat, to vary the amount of current passing to the ammeter according to the pressure within a tire, and consequently the pressure exerted thereby to control the variable resistance of the carbon pile and the flow of current to the ammeter, according to the degree of pressure in the tire, whereby, in either instance, a warning will be given to the driver or operator so that a defective tire may be immediately taken care of.

Other objects and advantages reside in the details of construction and operation as more fully hereinafter described and claimed, reference being had to the accompanying drawings forming part hereof, wherein like numerals refer to like parts throughout, and in which:

Figures 1, 2, 3, 4, 5:
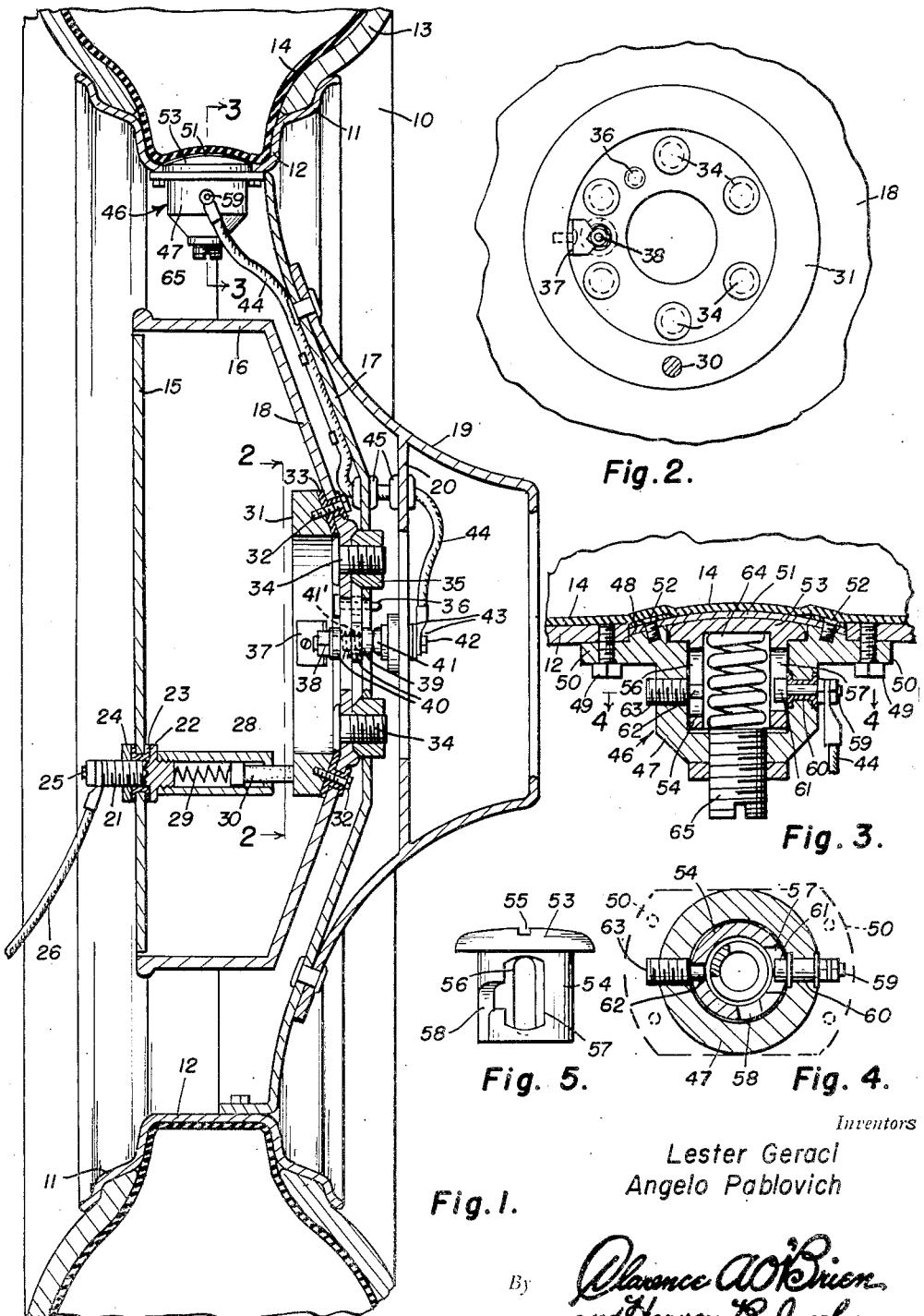
Figure 1 is a sectional view showing a wheel of an automobile equipped with a signal device operating switch and circuit arrangement in accordance with the invention.
Figure 2 is a sectional view taken on the line 2—2 of Figure 1.
Figure 3 is an enlarged sectional view taken on the line 3—3 of Figure 1.
Figure 4 is a transverse sectional view taken on the line 4—4 of Figure 3.
Figure 5 is a detail elevation of a pressure contact piston employed in connection with the wheel switch.

Referring to the drawings in detail, and more especially to Figures 1 to 6, inclusive, each of the front and rear wheels 10 is shown with a rim 11, illustrated as of the beaded or clincher type having a reduced central annular portion or drop center 12, the rim receiving the usual pneumatic tire including a shoe or casing 13 and an inflated inner tube 14 having the usual inflating valve (not shown). The usual brake shoe flange or backing plate 15 is stationary with the usual front axle or rear axle housing and is associated with the usual brake drum 16 which revolves with the wheel including the outer disk 17 over the outer portion or front 18 of the brake drum and associated, if desired, with a hub cap or flange 19 having an intermediate, inwardly extending annular flange 20, although the same may be of any preferred construction or conventional form connected to the brake drum by a conventional hub structure designed to operate upon the usual axle spindle. Secured to the flange or back plate 15 which supports the usual brake shoes operating in connection with the drum 16, such as the internal expanding type, is an externally threaded terminal 21 which extends through an opening in said flange or plate 15 spaced radially from the center thereof and axis of rotation of the wheel and having an inside retaining flange 22, as well as insulated from the plate 15 through which it extends, by suitable fiber or other insulating washers 23 around the terminal and between the flange 22 and the plate, as well as between a retaining or lock nut 24 threaded on the terminal at the inside to secure the terminal in position against said plate 15. The terminal 21 has a binding post 25, from which a wire 26 connected at its terminal end thereto leads from each wheel to a signal, such as a light 27 of a series of four, depending upon the number of wheels and tires, positioned on the dash or instrument panel of the vehicle. A long metal sleeve 28 is threaded or otherwise detachably connected to the projecting outer end of the terminal 21 forwardly of the flange 22 within the drum 16 and the outer end may be provided with a seat for receiving the inner end of a spring 29, enclosed in the sleeve or enveloped thereby, which furnishes pressure against the enlarged inner end of a carbon brush 30 which is held and projected outwardly of the outer end of said sleeve. Secured within the wall 18 of the brake drum is a slip ring 31 shaped to conform to said wall and held in place through apertures therein in circular series, as shown in Figures 1 and 2, by means of screws 32 entering threaded sockets in the ring and insulated from the brake drum by insulating washers 33. Bolts 34 are shown connecting the brake drum 16 at the slip ring opening with the disk 17 of the wheel, retained by nuts 35. A pin 36 is carried by the brake drum and projects outwardly through an opening in the disk to line up the bolts 34 and so that the wheel can only be placed in that position to line up the contacts of the circuit now to be described.

Carried by each slip ring 31 is a metal strap or angle member 37 carrying a suitable bolt 38 clamped at the inside through the central portion of the brake drum 16 and a contact 39 at its outer end, insulated as shown at 40 from the brake drum in the same manner as the terminal 21 is insulated from the back or face plate 15 and the screws 32 are insulated from the brake drum 16 at the portion 18 thereof. Contact 39 makes contact with a contact 41 secured to and insulated from the wheel at the flange 20 by means of a bolt or binding terminal 42 and insulated therefrom as shown at 43 with springs 41' to keep the connection tight. From the bolt or screw terminal 42, an electrical connection or wire 44, connected at the terminal thereof and clamped in position by the nut on the bolt or terminal 42, extends through the wheel portions 20 and 17 through insulated washers or bushings 45 by which current is transmitted to a pressure unit and switch 46 by the wire extending along the inside of the disk 17 to the rim 12.

The pressure unit 46, as shown in Figures 1 and 3 to 5, inclusive, comprises a cylindrical casing 47 having an annular flange beveled outwardly, as indicated at 48, which extends through an opening in the drop center 12 of the rim 11 and is secured in position by means of bolts 49 extending through apertures of opposite attaching flanges 50 projecting from the casing 47 secured in threaded apertures in the drop center of the rim and having the other two sides thereof flattened as shown. A flexible diaphragm 51 is secured over the enlarged inner bore of the casing 47 at the flange 48, by screws or the like, as indicated at 52, and contacts with the inner tube 14 so as to be acted upon by the pressure within said tube and tire. The diaphragm 51 on the inside acts upon the convex outer head 53 flanged to seat within an annular recess inside of the flange 48 at the outer end of the casing 47 and formed on the outer end of a piston or sleeve 54 which is movable radially within the casing 47 so as to operate freely within the bore thereof. This piston has a head slot 55 for operation by a screwdriver, and at one side is provided with a narrow longitudinal slot 56 and at the opposite side with an aligned, wider longitudinal slot 57 terminating in an entrance portion or keyhole slot 58 curved laterally from the slot 57 and extending to the open, inner end of the sleeve or piston 54. The other terminal end of the wire 44 connects to a terminal contact 59 in the form of a binding post with suitable locking and adjusting nuts, and extends radially through the wall of the casing 47 from which it is electrically insulated, as indicated at 60, while the inner end thereof has an enlarged head 61 operating in the slot 57 which is shorter than the slot 56. The longer slot 56 which is narrower than the slot 57 receives the reduced end 62 of a limiting and stop screw 63 threaded through a radial lateral bore in the casing 47 and is cut to close tolerance so as to give a good fit for the reduced inner end 62 to avoid any side play in the piston 54 and thereby prevent contact of the enlarged contact head 61 with the sides of the slot 57 but adapted to permit contact thereof with the ends of the slot 57 at the piston 54 when the piston travels its entire length and is limited in its movement by engagement of the head 61 with the ends thereof, especially the inner end, due to under-inflation of the tire and inner tube when the pressure has fallen below the desired or normal operating pressure. A spring 64 is mounted within the piston to act on the flanged head 53 thereof, the outer end engaging the closed outer end of the piston and the inner end seating against an adjustment screw 65 threaded through the reduced threaded bore at the inner end of the casing 47, to adjust the tension of the spring to the desired pressure for the tire and adapted to cause outward radial movement of the piston and engagement of the inner end of the slot 57 with the contact 61 when the pressure is below normal. In other words, when the pressure within the tire and inner tube is below normal, or that desired for running operation, the spring 64 will force the piston outwardly, the tension of the spring 64 being set or adjusted by the screw 65 so that the piston will travel outwardly from the cylinder and therein and will engage or touch the stop 62 and the contact 61 of the terminal 59 to also serve as a stop as to the longitudinal movement of the piston radially of the wheel and rim while the stop 62 prevents rotation thereof and engagement of the contact 61 with the sides of the slot 57 of the piston. This will complete an electrical circuit to the signal of the respective wheel and tire, inasmuch as each wheel or its rim is grounded to the frame, axle or body of the car, as indicated at 66 in Figure 6 of the drawings showing the diagram of the circuit for operating a separate signal 27 for each tire. In other words, the construction of each wheel and pressure unit and contacts therein is the same for all wheels, and a conductor 26 leads from each pressure unit and contact 46 and through the contacts and wire 44 to the terminal 25, to which the wire 26 is connected to extend to each signal 27, which may be visual, such as a light, or audible or otherwise. The signals 27 are, in turn, connected to a common conductor or wire 67 and through a switch 68, such as the ignition switch or otherwise, to control the circuit, and to a source of energy represented by the battery 69 of the car which is grounded to the automobile frame, as indicated at 70. In this way, the circuit to each pilot light or signal 27 is normally open until the pressure within the tire inner tube falls below the desired running pressure, when the circuit is closed through the engagement of the piston 54 with the contact 61, and the location of the pilot lights or signals 27 are such as to indicate the respective tire in which the pressure is too low, by operating its respective pilot light on the instrument panel or dash of the vehicle to be readily observed by the operator or driver, so that the vehicle can be stopped and the tire which is defective or in which the pressure is too low, attended to at once to avoid accidents. Thus, an instantaneous warning is given the operator when a tire is defective by reason of a leak, blowout or low pressure. To remove the piston 54 from the unit 46, the stop screw 63 is first removed to permit the piston to turn in the casing 47 and by using a screwdriver in the groove or slot 55 of the piston head 53, and giving the same a half turn, the piston may be removed through the rim after removal of the tire or by detaching the unit 46 at the screws 49, by permitting the head 61 to pass through the entrance slot 58, thus permitting convenient and quick assembly and disassembly of the pressure and contact unit 46 while permitting the device to be produced in a simple form at low cost.

In Figures 7 to 11, inclusive, the signal system is shown as applied to dual wheels of a semi-trailer, tractor, bus or other automobile or vehicle using such system, in which the pressure units and signals operate in the same manner as described in connection with Figures 1 to 6, inclusive. In this form, the inner wheel is designated at 71 and the outer wheel at 72, having the rims 73 and the usual tires 12 and inner tubes 14, as described in connection with Figure 1. The flange or stationary base or back plate mounting the brake shoes, and stationary with the axle 74, is indicated at 15 and the drum at 16, as previously described, with the front portion or outer wall 18 for the inner wheel, to which the outer wheel is bolted, as indicated at 75, around the hub 76, the cap of which is bolted in position, as indicated at 77, in a conventional manner. The rim may be of any usual construction employed in dual wheel structures. In this form, the wires 26 pass through the flange or base plate 15 at the insulated washers or bushings 78 and may be fastened to the axle housing, as indicated at 79, with similar brush arrangements mounted in U-shaped brackets 80 fastened to the plate 15, as indicated at 81, by means of apertured flanged seats on the legs or sides of the brackets extending within the drum and connected to terminals 25 with adjusting screws 21, nuts 24, insulated washers or bushings 23, flanges 22 and cylinders or sleeves 28 enclosing springs 29 and similar carbon brushes 30, as described in connection with Figure 1. These brushes engage a similar slip ring 31 secured to the brake drum, except that, in this instance, the ring 31 is the inner of a pair of concentric spaced inner and outer rings, including the outer ring 31', so that one brush 30 engages the outer ring 31', while the other brush 30' engages the inner ring 31, both secured to but insulated from the brake drum 16, as indicated at 33, each of which is used to transmit current to its respective pressure and contact unit mounted upon the outer side of the lateral wall 18 of the drum 16 instead of at the drop center or reduced portion of the rim as in Figure 1. Of course, the wires 26 and brushes 30 and 30' extend different distances radially of the brake drum flange or backing plate 15, to properly engage the slip rings 31 and 31' and the pressure units 46' are mounted on the brake drum at the front or outside to project from the inner wheel at the supporting disk 17' with openings therethrough rendering them accessible through the outer wheel and disk of the inner wheel, as indicated at 82. The inner ring is used to transmit current to the inner pressure unit and contact 46', while the outer ring is used to transmit current to the outer unit provided for the outer wheel and its tire and inner tube. However, in this form, a short jumper or wire 84 is used to convey the current from its respective slip ring after extending through and being insulated from the drum portion 18 to which the units are bolted and from which they are insulated, as indicated at 85. The units are mounted on the brake drum instead of through the drop center of the rims, for the reason that trucks or buses carry a heavy flap inside the casing which is very thick and bulky and through which connection cannot properly be made between the pressure and contact units and the inner tubes of the tires. However, the units instead of being constructed as shown in Figures 3 to 5, inclusive, have the short wires or jumpers 84 connected to the terminals 59 of the contacts 60 with the enlarged heads 61 in the construction shown in Figures 7 to 10, inclusive. However, the construction of these units is the same as heretofore described, with the parts similarly numbered, except that in lieu of the flanged heads 53 of the pistons 54, the head 53' is the same diameter as the bore of the casing, cylinder or cup 47' and the flange 52' has the flexible diaphragm 51' disposed between it and against the head 53' of the piston 54' and a cap plate or head 86 bolted in position, as indicated at 87 through aligned openings is said head and said flange. Each cap plate or head 86 has a concave recess 88 cooperating with the recess flange 50' of the casing 47' at its open end, in which the flexible diaphragm 51' is adapted to flex or move, and a passage 89 leads centrally therefrom and radially so that pressure may act upon the flexible or rubber diaphragm 51' at the air chamber provided in the head 86. An angular pipe fitting 90 is detachably fitted or connected to the passage 89, as indicated at 91 and extended laterally through an opening 82 of the inner wheel and has on its end an inflating valve 92 corresponding to the inflating valve of a tire. The fitting 90 has a branch 93 extending outwardly for connection with a flexible metal covered hose or conduit 94, as by a coupling or nipple 95, rendering the same detachable, and connected or mounted with an interposed fastening or coupling 96 by which connection is made to the inflating valves 97 of the respective tires and left on permanently because of the special fittings 90 which makes it possible to gauge the pressures of the tires, inflate or deflate by use of the valves 92 in the ends of said fittings, in the customary manner.

Figure 6:
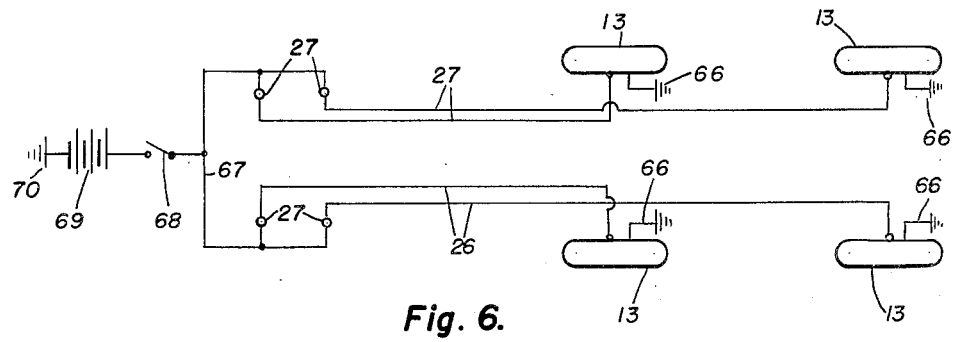
Figure 6 is a diagrammatic view showing the circuit applied to an automobile having single front and rear wheels and tires.
Figure 7:
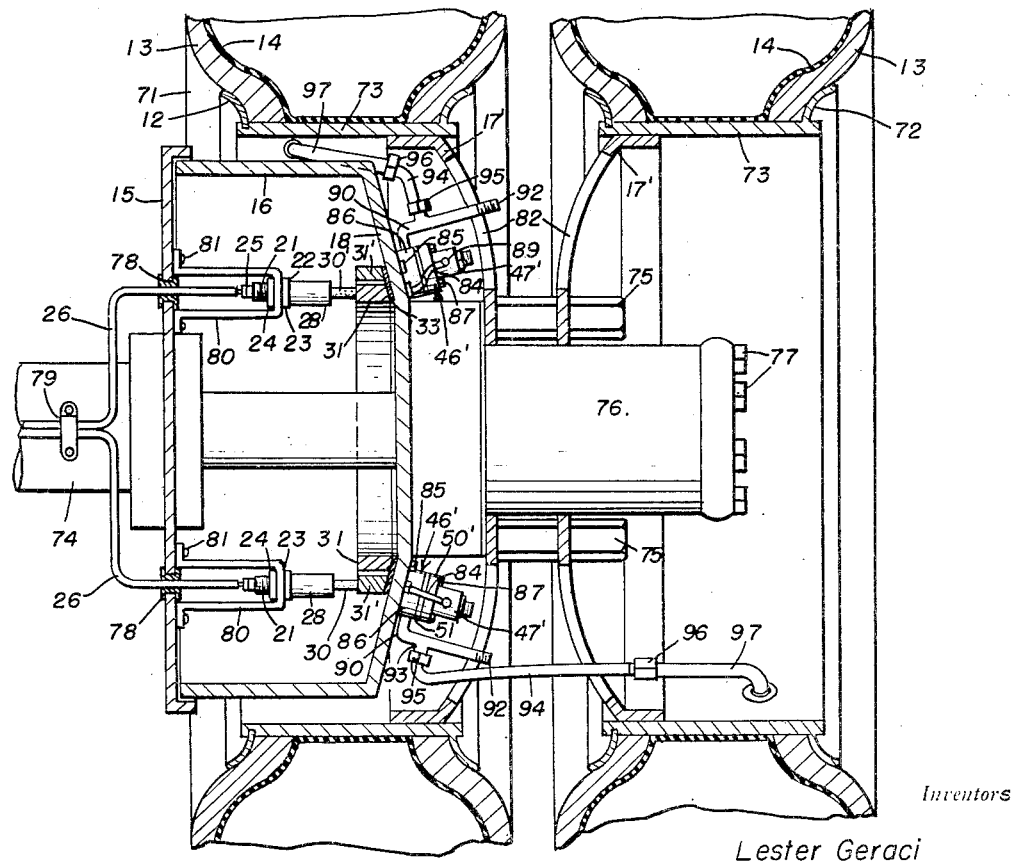
Figure 7 is a sectional view showing the device applied to dual wheels such as used on trucks or trailers.
Figure 11:
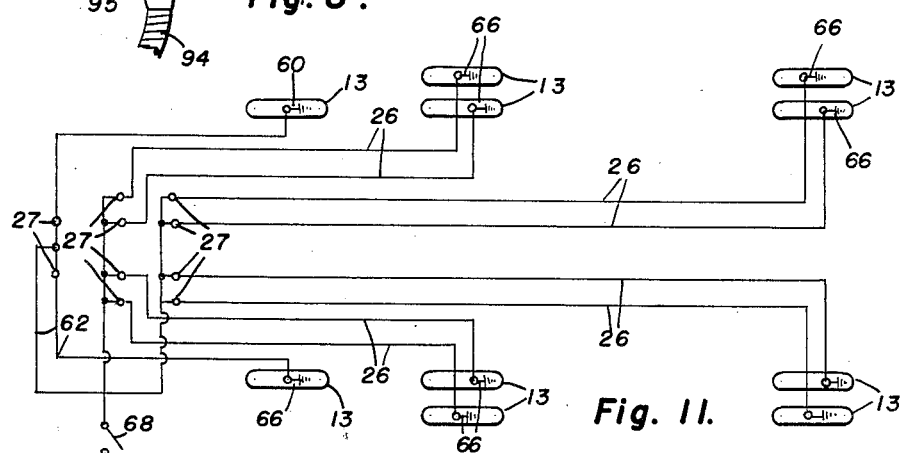
Figure 11 is a diagrammatic view of the circuit arrangement with signals, for use in connection with dual wheels as employed in connection with a semi-trailer truck.

The pressure and contact units 46' act in the same manner as the units 46 in that the air within the inner tubes of the tires acts upon the diaphragms 51' through the hose 94 and fitting 90, so that should the pressure in either tire be below normal or a leak or blowout occur, the tire will be deflated, thus permitting the spring 64 to move the piston 54' outwardly against the diaphragm 51' and close the circuit by the engagement of the contact 61 with the said cylinder through the piston at the casing 47' which is grounded to the wheel and frame through the axle or housing, in the manner previously described in connection with Figure 6, and as indicated at 66 in said figure, as well as in Figure 11 showing the diagram of the circuit for use in connection with dual wheels on a semi-trailer or truck, or the like. This circuit arrangement is the same as shown and described in connection with Figure 6, except that the wiring connections 26 are duplicated for each wheel and tire of the dual tire arrangement and for the single front wheels and tires to connect to each individual signal or pilot light 27 arranged on the instrument panel or dash in the respective order and relation in which the tires are arranged on the vehicle. Each connection 67 is duplicated for the respective lights, leading through the control switch or ignition switch 68 to the source of electrical energy represented by the battery 69 and grounded as indicated at 70, in the same manner as shown and described in connection with Figure 6. In other words, the circuit is closed through the frame and each signal, upon the pressure and contact unit of each tire and wheel operated under pressure below normal or when deflated, by movement of the respective pistons 54 or 54' into engagement with a contact 61, to close the circuit through the signal or pilot light 27 connected therewith and through the switch 68 when closed, to the battery 69 and through the frame or body of the car or automobile to the respective wheels, through the axles or housings thereof, at the units mounted in the rims.

Figure 8:
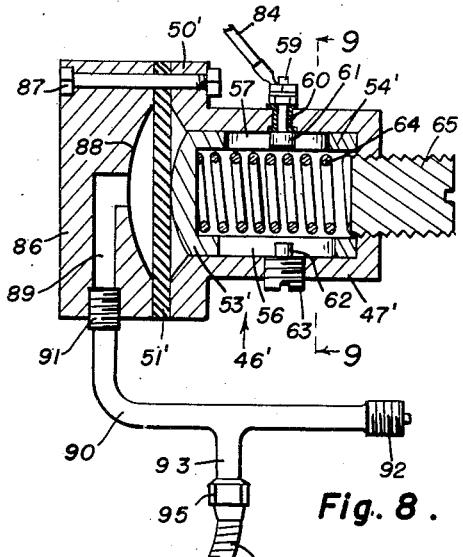
Figure 8 is an enlarged sectional view showing a contact switch employed in a dual wheel structure, as shown in Figure 7 and taken on the line 8—8 of Figure 9, with parts in elevation.
Figures 9, 10:
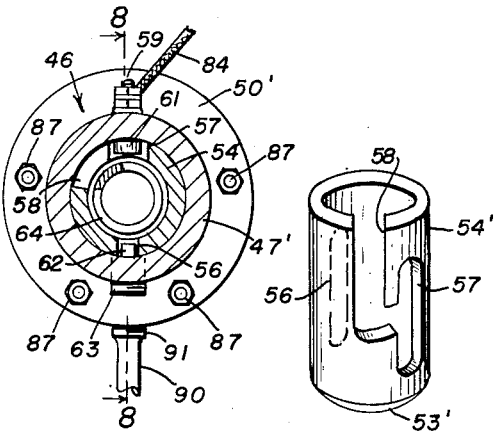
Figure 9 is a sectional view taken on the line 9—9 of Figure 8.
Figure 10 is a perspective view of a pressure piston and contact as employed in the switch shown in Figures 8 and 9.
Figure 12:
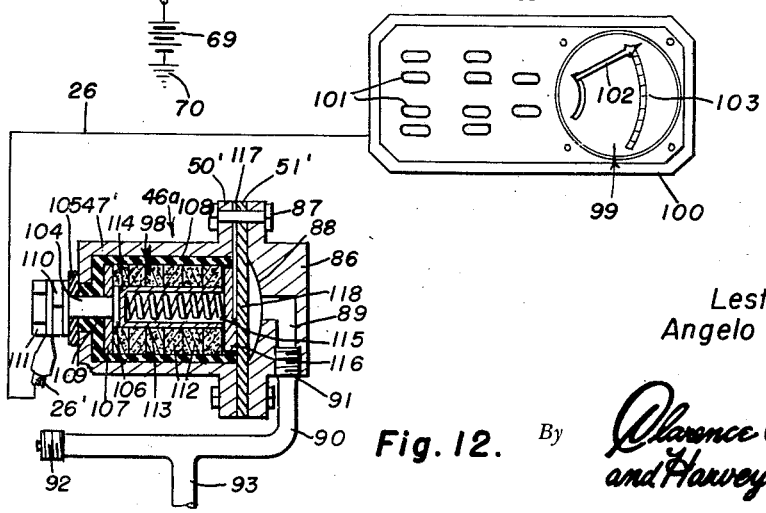
Figure 12 is a sectional view of a switch in the form of a carbon pile rheostat and associated ammeter with push buttons adapted to be associated with each wheel and tire for indicating the pressure therein in lieu of the switches shown in Figures 3 and 8 of the drawings.

In the form of the invention shown in Figure 12 of the drawings, a pressure unit 26a is employed, which is interchangeable with the pressure unit shown in Figure 8, although either may be modified for employment in the same manner as the pressure unit 46 shown in Figure 3 of the drawings by removing the head or cap plate 86 and using either piston 53 or 53' engaging the flexible diaphragm at the inner tube 14. The difference is in the internal construction of the unit 46a, the system shown in connection therewith being designed to indicate on the instrument panel or dash of the automobile, in the present instance, by a meter panel and push button arrangement to show any amount of pressure a tire may have by simply pushing a button on the panel in the cab of the vehicle. In this form, the cylinder housing or casing 47', as well as the diaphragm 51' and the cap plate or head 86 bolted as at 87 to and through the diaphragm and flange 50' of the cylinder or housing 47', is the same as previously described in connection with Figures 3 and 8, except that the cylinder or housing is shaped as shown in the latter figure. The pipe fitting 91 and its connections, together with the inflating valve 92, is also the same and connected to the tires through the rim in the same manner. However, in lieu of the internal contact structure for closing a circuit to the signals or pilot lights 27 as previously described, a carbon pile rheostat 98 which will vary the current through the meter 99 arranged on the meter panel 100 in the cab or on the instrument panel or dash by the varying pressure on the diaphragm 51' from the air pressure in the tire, is employed. In this instance, the wire 26' corresponding to the wire 26 of each tire is connected individually with a number of push buttons or other switches or contacts 101 on the panel 100, connected to the ammeter 99 which may be calibrated in pounds pressure and is preferably a direct current meter. The meter is shown with the pointer 102 cooperating with the dial calibrations 103 to indicate pounds pressure in the tires. The number and arrangement of the push button contacts or switches 101 corresponds to the number and arrangement of the tires on the vehicle, as shown in Figures 6 and 11, the latter arrangement being shown on the meter panel 100. Thus, each wire 26 is connected to a pressure unit which is essentially a carbon pile rheostat, as indicated at 46a to a terminal 104 through an insulating washer 105 around an opening at the adjacent end of the housing 47' or cylinder forming the same and has an enlargement or shoulder 106 on its inner end within said cylinder housing with an interposed metal washer 107 between said shoulder or flange 106 and a molded fiber or insulating liner 108 provided within the cylinder housing including the end thereof at the washer 107, behind which the shoulder 106 is provided inwardly of the housing cylinder within the insulating liner 108 and also insulating the stem of the terminal 104 where it passes through the end wall of the housing, as indicated at 109. This assembly is held snugly by means of a nut 110 on the threaded end of the terminal 104 and which presses against the insulating washer 105, while a nut 111 clamps the terminal of the wire 26 on the threaded terminal end of the binding post thus produced. Within the liner 108 are disposed a plurality of carbon washers 112 which are prevented by the liner 108 from contacting with the metal of the case or housing 47' and have their bores corresponding in diameter to the diameter of the shoulder 106 to receive therein in contact with said shoulder, a Bakelite or similar insulating sleeve 113 on which the carbon washers 112 are mounted in conjunction with the shoulder 106 at and engaging the closed end of the sleeve indicated at 114 and thus insulated therefrom at said shoulder. This prevents a short circuit through the metal case or housing 47'. A spring 115 is disposed within the sleeve 113 so as to be encased within the Bakelite sleeve or tube of which the same is formed and a metal washer 116 within the liner 108 is mounted on one end of the spring in connection with a radially extending metal strip 117 which extends between the flange 50' at the end of the housing or case 47' and the flexible diaphragm 51' and riveted to the metal washer, as indicated at 118, so as to be passed between the diaphragm and the case or housing upon clamping the head 86 in position by the bolts 87 with the bolt extending through the strip or strap 117, thus providing a conductor which will make a path for the current through the carbon washers which will offer a variable resistance to the flow of the current. The spring 115 will help separate the carbon washers 112 when the pressure on the diaphragm 51' becomes less, the Bakelite case or insulating sleeve 113 preventing the spring 115 from forming a short circuit between the terminal 104 and the metal washer 116. The outward appearance and size of this unit is the same as the unit described in connection with Figures 7 to 10 inclusive, and substantially the same as that shown in Figure 3, and the mounting and hose connections will be the same as indicated in Figure 12. Thus, by operating any one of the individual push buttons or contacts 101 to the meter for actuating the pointer or indicator thereof, the push button switches which will be self-releasing will permit the inspection and checking of any individual tire by selecting the respective push button of the unit and tire to which it is connected so as to indicate on the calibrated dial in pounds pressure per square inch, the degree of pressure in any one tire or all of them successively, to indicate when they are under-inflated and need attention. Obviously, the operation of the ammeter 99 is dependent upon the resistance offered by the carbon washers to the flow of current, depending upon the pressure exerted against the same by the pressure within the tire through the flexible diaphragm 51' and the connections thereof with the fitting 91 at the passage 89 and chamber 88 through the fitting 90 and inflating valve 97, while inflation of any tire may be had through the special valve 92 on said fitting. However, this device instead of operating automatically due to deflation or under-inflation of a tire tube will be manually operated by operating the respective push buttons 101 to select the different tires for indicating the pressure therein which controls the indication thereof through the pressure in the tire acting upon the carbon washers of the carbon pile rheostat of the pressure unit 46a and the resistance offered by said washers to the flow of current to the ammeter to indicate said pressure. The testing of the tires may be carried on periodically, or whenever occasion arises or inspection shows any indication of low pressure.

Thus, the device may be employed and readily installed on an automobile for use in connection with the wheels and tires thereof, to indicate the condition of the tires of said vehicle or automobile of any type having any number of tires, so that the pressure in the respective tires may be determined instantly at all times. The device is of very simple construction and may be easily installed, in addition to requiring a minimum number of simple parts of economical construction, which will require little servicing once installed. However, access to all parts may readily be obtained and the units disassembled and assembled in a quick and convenient manner, in case any renewals or replacements are necessary.

While in the foregoing there has been shown and described the preferred embodiment of this invention, it is to be understood that minor changes in the details of construction, combination and arrangement of parts may be resorted to without departing from the spirit and scope of the invention as claimed.

Having thus described our invention, what we claim as new and desire to secure by Letters Patent of the United States is:

1. In a tire pressure indicator for an automotive vehicle having a wheel, a tire mounted thereon, an inflated pneumatic tube within the tire, and a rim having an opening therein; a pressure unit mounted in said opening secured to the rim, said pressure unit including a housing, a diaphragm closing one end of the housing and engaging the inner tube to be acted upon by the pressure therein, a piston movable in the housing, an adjustable resilient member acting upon said piston to force the same against the diaphragm, said piston having opposed slots therein, a stop engaging one of said slots to prevent turning of the piston in the cylinder, a contact having an enlargement movable in the other slot and spaced from the sides thereof to contact the ends of the slot, and means adapted to operatively connect said contact to a signal, whereby when the pressure in the tube is below normal, said piston will move outwardly to engage the contact at one end of the second slot therein.

2. In a tire pressure indicator for an automotive vehicle having a wheel, a tire mounted thereon, an inflated pneumatic tube within the tire, and a rim having an opening therein; a pressure unit mounted in said opening and secured to the rim, said pressure unit comprising a housing, a diaphragm closing one end of the housing and engaging the inner tube, a tubular piston movable in the housing having a convex head adapted to contact said diaphragm, an adjusting screw received in said housing and extending into said piston, a coil spring in said piston interposed between said screw and said convex head and normally urging the latter into contact with said diaphragm, a narrow longitudinal slot through one side of said piston and a wider, longitudinal slot through said piston diagonally opposed to said narrow slot, said wider slot including an arcuate entrance portion, a contact insulated from said piston and extending through said wider slot, a limiting screw carried by said housing and extending through said narrow slot to prevent side play in said piston, and means adapted to operatively connect said contact to a signal.

LESTER GERACI.
ANGELO PABLOVICH.

REFERENCES CITED

The following references are of record in the file of this patent:

UNITED STATES PATENTS

| Number | Name | Date |
|---|---|---|
| 1,294,923 | Long | Feb. 18, 1919 |
| 1,657,406 | McGuire | Jan. 24, 1928 |
| 2,033,424 | Gieskieng | Mar. 10, 1936 |
| 2,248,047 | Addy et al. | July 8, 1941 |
| 2,249,426 | Jones et al. | July 15, 1941 |
| 2,314,965 | Alava y Sautu | Mar. 30, 1943 |
| 2,429,024 | Jones | Oct. 14, 1947 |